(12) United States Patent
Kato et al.

(10) Patent No.: US 12,338,876 B2
(45) Date of Patent: Jun. 24, 2025

(54) RAW EDGE V-BELT

(71) Applicant: BANDO CHEMICAL INDUSTRIES, LTD., Hyogo (JP)

(72) Inventors: Hideyuki Kato, Kishiwada (JP); Hideyuki Tashiro, Meerbusch (DE)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/669,955

(22) Filed: May 21, 2024

(65) Prior Publication Data
US 2024/0410444 A1 Dec. 12, 2024

(30) Foreign Application Priority Data
Jun. 6, 2023 (JP) ................... 2023-093343

(51) Int. Cl.
*F16G 5/20* (2006.01)
*F16G 5/08* (2006.01)

(52) U.S. Cl.
CPC ...... *F16G 5/20* (2013.01); *F16G 5/08* (2013.01)

(58) Field of Classification Search
CPC ..... F16H 9/24; F16G 5/08; F16G 5/20; F16G 5/06
USPC .................................................. 474/205, 268
See application file for complete search history.

(56) References Cited

U.S. PATENT DOCUMENTS

| | | | | |
|---|---|---|---|---|
| 12,092,188 | B2 * | 9/2024 | Mitsutomi | F16G 5/20 |
| 2003/0027920 | A1 * | 2/2003 | Kinoshita | F16G 5/20 |
| | | | | 524/508 |
| 2015/0285335 | A1 * | 10/2015 | Mitsutomi | F16G 5/06 |
| | | | | 156/137 |
| 2018/0305179 | A1 * | 10/2018 | Guilani | D07B 1/005 |
| 2019/0003555 | A1 * | 1/2019 | Ishiguro | C08L 21/00 |
| 2019/0128372 | A1 * | 5/2019 | Ishiguro | B32B 3/263 |
| 2019/0128373 | A1 * | 5/2019 | Ishiguro | F16G 5/06 |
| 2021/0148436 | A1 * | 5/2021 | Kimura | F16G 5/06 |
| 2021/0215228 | A1 * | 7/2021 | Nishida | B32B 3/04 |
| 2022/0056983 | A1 * | 2/2022 | Hamamoto | D06M 23/18 |
| 2022/0090648 | A1 * | 3/2022 | Doi | C08L 15/02 |
| 2022/0099157 | A1 * | 3/2022 | Mitsutomi | B29D 29/103 |
| 2022/0137312 | A1 * | 5/2022 | Kirkpatrick | G02B 6/4431 |
| | | | | 385/109 |
| 2022/0325777 | A1 * | 10/2022 | Esaka | F16G 1/16 |
| 2022/0348753 | A1 * | 11/2022 | Esaka | C08L 21/00 |

FOREIGN PATENT DOCUMENTS

EP 3 106 712 A1 12/2016
WO WO2015/121907 A1 8/2015

* cited by examiner

*Primary Examiner* — Henry Y Liu
(74) *Attorney, Agent, or Firm* — Greenblum & Bernstein, P.L.C.

(57) ABSTRACT

A raw edge V-belt includes a belt body made of rubber and having pulley contact surfaces formed on both sides thereof in a belt width direction, and a cord embedded in the belt body, wherein a compressive elastic modulus of the raw edge V-belt in the belt width direction measured at 120° C. is not less than 150 MPa and not greater than 250 MPa, and a 90° coefficient of friction on a belt side surface of the raw edge V-belt is not less than 1.4 and not greater than 1.8.

2 Claims, 5 Drawing Sheets

RAW EDGE V-BELT

TECHNICAL FIELD

The present disclosure relates to a raw edge V-belt.

This application claims priority on Japanese Patent Application No. 2023-093343 filed on Jun. 6, 2023, the entire contents of which are incorporated herein by reference.

BACKGROUND ART

A raw edge V-belt made of rubber is used as a transmission belt in a belt-type continuously variable transmission mounted on a vehicle such as a motorcycle, a buggy (all terrain vehicle: ATV), or a snowmobile.

For example, PATENT LITERATURE 1 discloses a double-cogged V-belt including an embedded cord having a shrinkage rate of not less than 1.2% and not greater than 2.0% when subjected to a thermal treatment at 120° C. for 1 hour, for the purpose of suppressing a change in transmission ratio over time.

CITATION LIST

Patent Literature

PATENT LITERATURE 1: International Publication No. WO2015/121907

SUMMARY OF THE INVENTION

A raw edge V-belt according to an aspect of the present invention is a raw edge V-belt including:
a belt body made of rubber and having pulley contact surfaces formed on both sides thereof in a belt width direction; and
a cord embedded in the belt body, wherein
a compressive elastic modulus of the raw edge V-belt in the belt width direction measured at 120° C. is not less than 150 MPa and not greater than 250 MPa, and
a 90° coefficient of friction on a belt side surface of the raw edge V-belt is not less than 1.4 and not greater than 1.8.

DETAILED DESCRIPTION

Technical Problem

A raw edge V-belt for gear change is required to maintain a shaft load within an appropriate range while suppressing a change in transmission ratio over time.

In particular, a raw edge V-belt, for gear change, used in a buggy or a snowmobile is required to have the above-described characteristics during high-load transmission.

Solution to Problem

The present invention has been made in view of such circumstances. An object of the present invention is to provide a raw edge V-belt that has a reduced change in transmission ratio over time and can maintain a shaft load within an appropriate range.

(1) A raw edge V-belt according to an aspect of the present invention is a raw edge V-belt including:
a belt body made of rubber and having pulley contact surfaces formed on both sides thereof in a belt width direction; and
a cord embedded in the belt body, wherein
a compressive elastic modulus of the raw edge V-belt in the belt width direction measured at 120° C. is not less than 150 MPa and not greater than 250 MPa, and
a 90° coefficient of friction on a belt side surface of the raw edge V-belt is not less than 1.4 and not greater than 1.8.

The above raw edge V-belt can maintain a shaft load within an appropriate range while suppressing a change in transmission ratio over time to be small. The above raw edge V-belt can maintain a shaft load within an appropriate range while suppressing a change in transmission ratio over time to be small even during high-load transmission.

In addition, the above raw edge V-belt also has sufficient transmission efficiency, so that the belt temperature is less likely to rise during running.

Therefore, the above raw edge V-belt is a belt having a very good performance balance.

(2) The above raw edge V-belt is preferably a double-cogged V-belt having a plurality of cogs on each of a belt inner circumference side and a belt outer circumference side thereof.

This is because a double-cogged V-belt for a belt-type continuously variable transmission is particularly required to maintain a shaft load within an appropriate range while suppressing a change in transmission ratio over time to be small.

Advantageous Effects of the Invention

According to the aspect of the present invention, it is possible to provide a raw edge V-belt that has a reduced change in transmission ratio over time and can maintain a shaft load within an appropriate range.

Hereinafter, an embodiment of the present invention will be described with reference to the drawings. The embodiment disclosed below is merely illustrative in all aspects and is not restrictive. The scope of the present invention is defined by the claims, not the embodiment, and includes all changes that come within the range of equivalency of the configurations recited in the claims.

Figure 1:
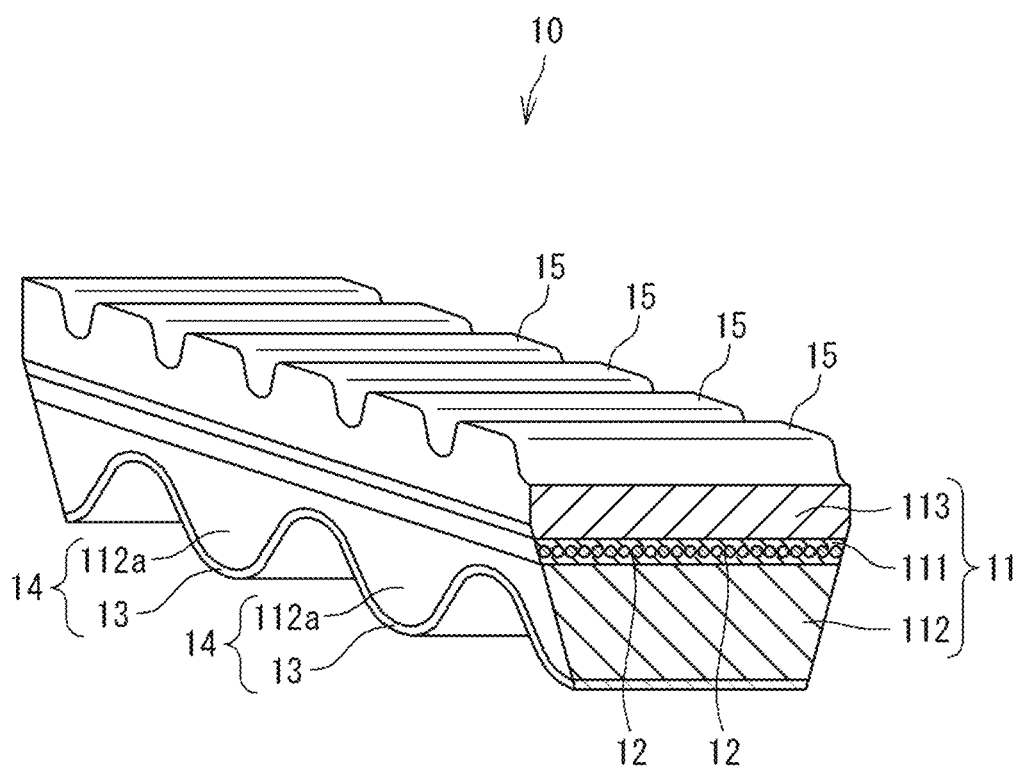
FIG. 1 is a perspective view schematically showing a part of a double-cogged V-belt according to one embodiment.
Figure 2:
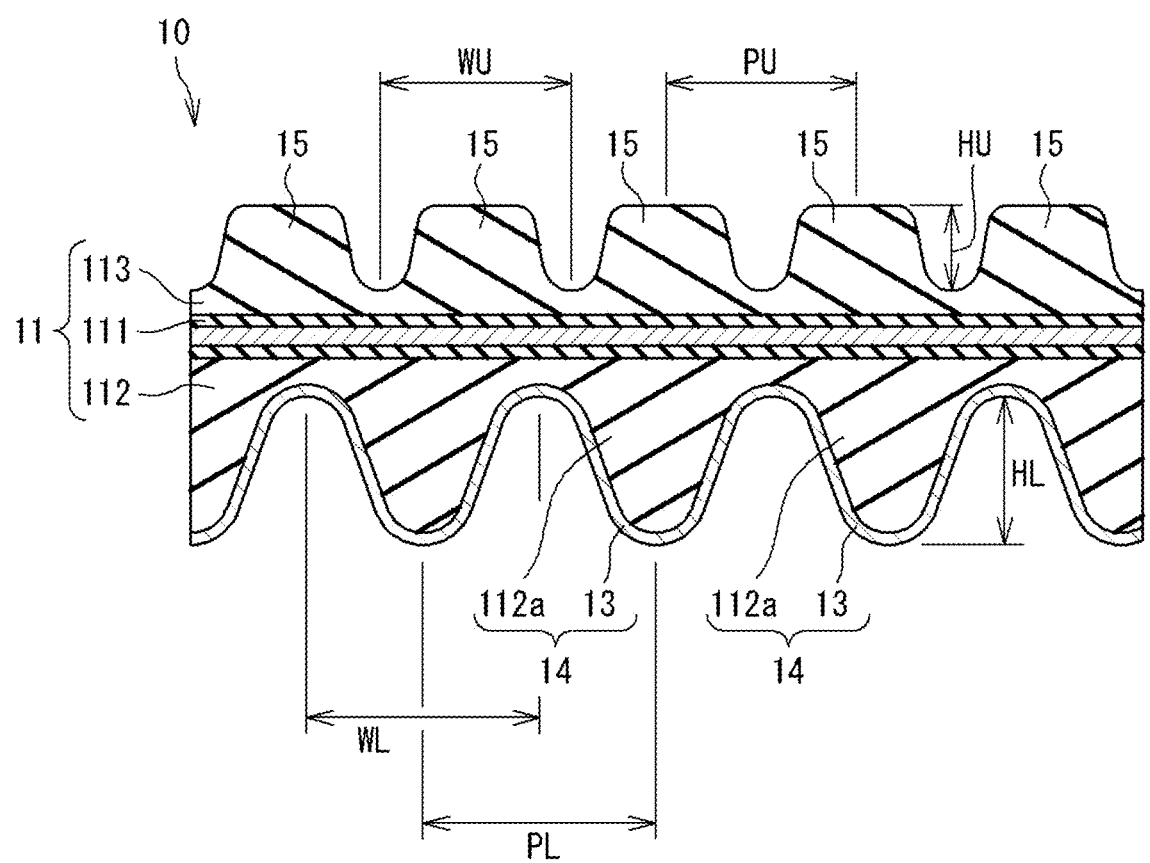
FIG. 2 is a cross-sectional view of the double-cogged V-belt in FIG. 1 along a belt length direction.

FIG. 1 and FIG. 2 show a double-cogged V-belt 10 (raw edge V-belt) according to one embodiment of the present invention. The double-cogged V-belt 10 is, for example, a raw edge V-belt used as a power transmission member for gear change in a transmission of an ATV or a snowmobile.

The double-cogged V-belt 10 is an endless transmission belt.

The length of the double-cogged V-belt 10 is, for example, not less than 500 mm and not greater than 1400 mm. The maximum belt width of the double-cogged V-belt 10 is, for example, not less than 15 mm and not greater than 40 mm. The maximum belt thickness of the double-cogged V-belt 10 is, for example, not less than 7.0 mm and not greater than 18.0 mm.

The double-cogged V-belt 10 includes a belt body 11, a cord 12, and a reinforcement fabric 13.

The belt body 11 is made of rubber.

The shape of a cross-section, of the belt body 11, perpendicular to the belt length direction is a shape obtained by combining a rectangle located on the belt outer circumference side and a trapezoid located on the belt inner circumference side and having a short base (see FIG. 1).

Both side surfaces of the belt body 11 have inclined surfaces. These inclined surfaces serve as pulley contact surfaces.

The belt body 11 includes three layers that are an adhesive rubber layer 111 in a middle portion in the belt thickness direction, a compression rubber layer 112 on the belt inner circumference side, and a stretch rubber layer 113 on the belt outer circumference side.

The cord 12 is embedded in a middle portion in the belt thickness direction of the adhesive rubber layer 111. The cord 12 is provided so as to extend along the circumferential direction to form a helix having a pitch in the belt width direction.

The reinforcement fabric 13 is provided so as to cover the surface on the belt inner circumference side of the compression rubber layer 112.

A plurality of lower cog forming portions 112a are arranged at a fixed pitch along the belt length direction on the inner circumference of the compression rubber layer 112. The lower cog forming portions 112a are provided such that contour lines on the belt inner circumference side thereof form a sine curve in a cross-section along the belt length direction.

A plurality of upper cogs 15 are arranged at a fixed pitch along the belt length direction on the outer circumference of the stretch rubber layer 113. A cross-sectional shape of each upper cog 15 in a cross-section along the belt length direction is substantially trapezoidal.

Each upper cog 15 has, for example, a height HU of not less than 2.0 mm and not greater than 5.0 mm, a width WU of not less than 8.0 mm and not greater than 10.0 mm, and an arrangement pitch PU of not less than 8.0 mm and not greater than 10.0 mm.

The adhesive rubber layer 111, the compression rubber layer 112, and the stretch rubber layer 113 are each composed of a crosslinked product of an uncrosslinked rubber composition in which a rubber component is blended and kneaded with additives as necessary.

Examples of the rubber component include chloroprene rubber (CR), chlorosulfonated polyethylene rubber (CSM), hydrogenated acrylonitrile rubber (H-NBR), ethylene-α-olefin elastomers (EPDM, EPR, etc.), etc.

Among them, chloroprene rubber (CR) and ethylene-propylene-diene terpolymer (EPDM) are preferable.

Examples of the additives include a reinforcement material, a filler, an antioxidant, a softener, a crosslinking agent, a vulcanization accelerator, a vulcanization accelerator aid, a co-crosslinking agent, a processing aid, etc.

The adhesive rubber layer 111, the compression rubber layer 112, and the stretch rubber layer 113 may be formed using the same rubber composition, or may be formed using different rubber compositions, respectively.

The compression rubber layer 112 and the stretch rubber layer 113 may contain staple fibers as a reinforcement material. In the case where staple fibers are contained, it is preferable that the staple fibers are oriented in the belt width direction. By orienting the staple fibers in the belt width direction, the rigidity in the belt width direction can be increased.

The cord 12 is embedded in a middle portion in the thickness direction of the adhesive rubber layer 111 of the belt body 11. The cord 12 has a pitch in the belt width direction and is provided so as to form a helix.

The outer diameter in the belt width direction of the cord 12 is preferably not less than 0.7 mm and not greater than 1.3 mm, and more preferably not less than 0.9 mm and not greater than 1.1 mm.

The arrangement pitch in the belt width direction of the cord 12 is preferably not greater than 1.30 mm, more preferably not greater than 1.25 mm, and further preferably not greater than 1.20 mm.

The arrangement pitch in the belt width direction of the cord 12 is the distance in the belt width direction between the centers of adjacent cords 12.

The cord 12 is composed of a twisted yarn. Examples of fibers forming the twisted yarn include polyester fibers, polyethylene naphthalate fibers, aramid fibers, vinylon fibers, etc.

It is preferable that the cord 12 is subjected to an adhesive treatment. By subjecting the cord 12 to the adhesive treatment, the adhesive strength with the adhesive rubber layer 111 can be improved. The adhesive treatment is performed before molding processing.

As the above adhesive treatment, an adhesive treatment in which heating is performed after immersion in a prime coat treatment agent containing an epoxy or isocyanate compound, an adhesive treatment in which heating is performed after immersion in an RFL aqueous solution, an adhesive treatment in which drying is performed after immersion in rubber glue, etc., can be employed. Only one of these adhesive treatments may be performed, or two or more of these adhesive treatments may be performed in combination.

The reinforcement fabric 13 is provided so as to cover the inner circumferential surface of the compression rubber layer 112 of the belt body 11. The lower cog forming portions 112a of the compression rubber layer 112 are covered with the reinforcement fabric 13, and the lower cog forming portions 112a and the reinforcement fabric 13 form lower cogs 14.

Each lower cog 14 has, for example, a height HL of not less than 4.0 mm and not greater than 8.0 mm, a width WL of not less than 8.0 mm and not greater than 12.0 mm, and an arrangement pitch PL of not less than 8.0 mm and not greater than 12.0 mm.

The thickness of the reinforcement fabric 13 is, for example, not less than 0.1 mm and not greater than 1.0 mm.

The reinforcement fabric 13 is normally composed of a woven or knitted fabric. Examples of the fiber material forming the reinforcement fabric 13 include aliphatic polyamide fibers, aramid fibers, polyester fibers, cotton, etc.

From the viewpoint of enhancing adhesion to the compression rubber layer 112, it is preferable that the reinforcement fabric 13 is subjected to an adhesive treatment before being adhered to the compression rubber layer 112.

As the above adhesive treatment, for example, an adhesive treatment in which heating is performed after immersion in a prime coat treatment agent containing an epoxy or isocyanate compound, an adhesive treatment in which heating is performed after immersion in an RFL aqueous solution, an adhesive treatment in which drying is performed after immersion in rubber glue, an adhesive treatment in which a surface on the belt body 11 side is coated with high-viscosity rubber glue and dried, etc., can be employed. Only one of these adhesive treatments may be performed, or two or more of these adhesive treatments may be performed in combination.

The double-cogged V-belt 10 has a compressive elastic modulus of not less than 150 MPa and not greater than 250 MPa in the belt width direction as measured at 120° C., and a 90° coefficient of friction on a belt side surface thereof is not less than 1.4 and not greater than 1.8.

The double-cogged V-belt 10 which simultaneously satisfies the above compressive elastic modulus and the above coefficient of friction can have a reduced change in transmission ratio over time regardless of during low or high-load transmission, and can maintain a shaft load within an appropriate range. In addition, the double-cogged V-belt 10 also has sufficient transmission efficiency, so that the belt temperature is also less likely to rise during running.

The reason why the above compressive elastic modulus is measured at 120° C. is that the temperature of the double-cogged V-belt 10 rises to about 120° C. when the double-cogged V-belt 10 is used as a belt for a belt-type continuously variable transmission mounted on an ATV, a snowmobile, or the like.

If the above compressive elastic modulus is less than 150 MPa, a change in transmission ratio over time during high-load transmission becomes larger due to buckling deformation or the like of the double-cogged V-belt 10.

On the other hand, if the above compressive elastic modulus exceeds 250 MPa, a shaft load may become excessively large and the burden on a shaft (burden on a bearing supporting the shaft) may become excessively high, or the belt body 11 may become excessively hard and the amount of heat generated during bending may become excessively large. In addition, there is a high possibility that separation or cracks are likely to occur in the belt body 11.

The above compressive elastic modulus is preferably not less than 200 MPa and not greater than 250 MPa.

If the above 90° coefficient of friction is less than 1.4, a change in transmission ratio over time during high-load transmission becomes larger. In addition, the shaft load is worsened. On the other hand, if the 90° coefficient of friction exceeds 1.8, the belt temperature is likely to rise, and the belt transmission efficiency is likely to decrease.

The above 90° coefficient of friction is more preferably not less than 1.4 and not greater than 1.6.

The above shaft load is a load generated when the double-cogged V-belt bridges a drive shaft and a driven shaft.

A fact that the above shaft load is high means that the belt tension is high. If the shaft load is excessively high, the burden on the shafts becomes excessively high. In addition, the belt temperature is likely to rise, increasing the possibility of belt separation.

On the other hand, if the shaft load is excessively low, the belt tension is low, so that a slip between a pulley and the belt is more likely to occur. As a result, an increase in ratio change and an increase in heat generation due to a slip occurs.

The above shaft load is detected using a load cell.

The above compressive elastic modulus is measured by the following method.

Figure 3:
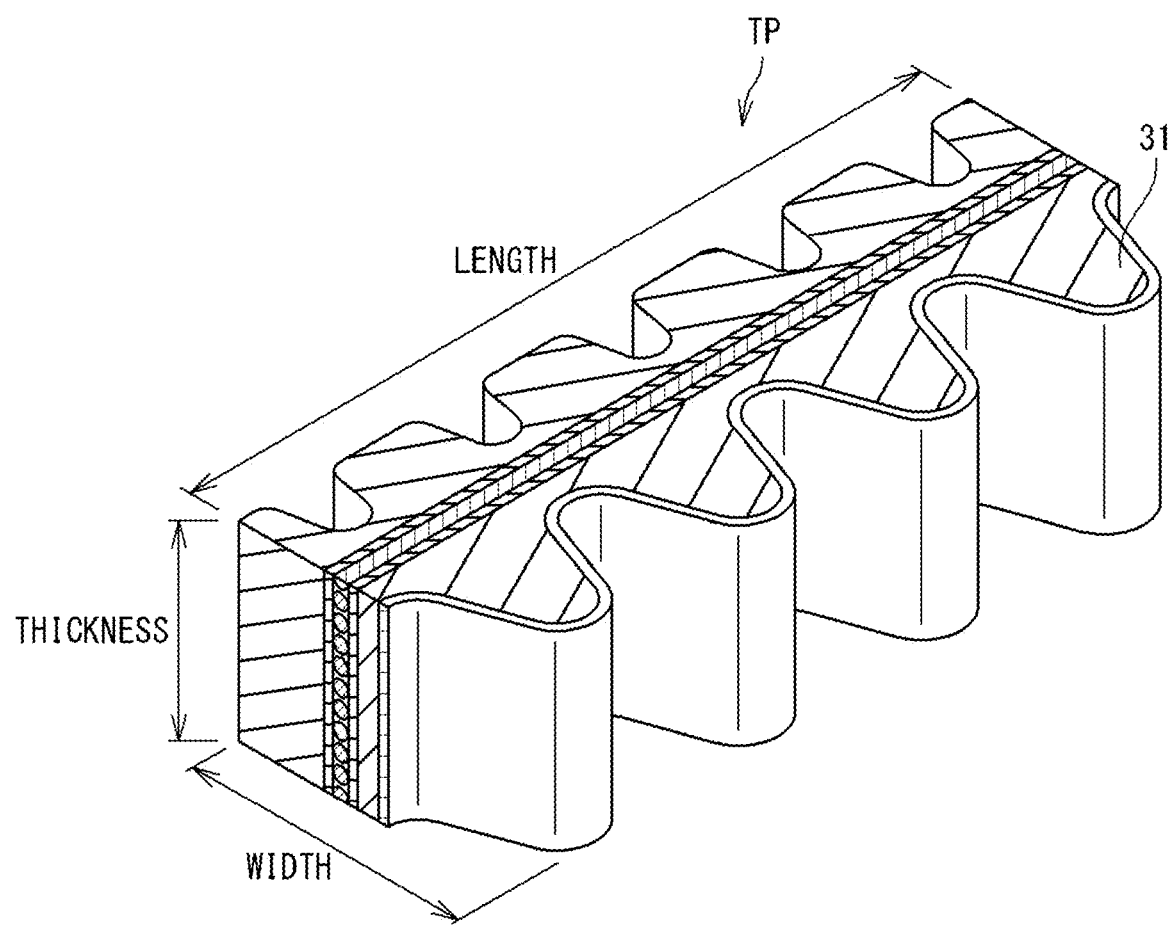
FIG. 3 illustrates a test piece for measuring a compressive elastic modulus.

FIG. 3 illustrates a test piece for measuring the compressive elastic modulus.

Figure 4:
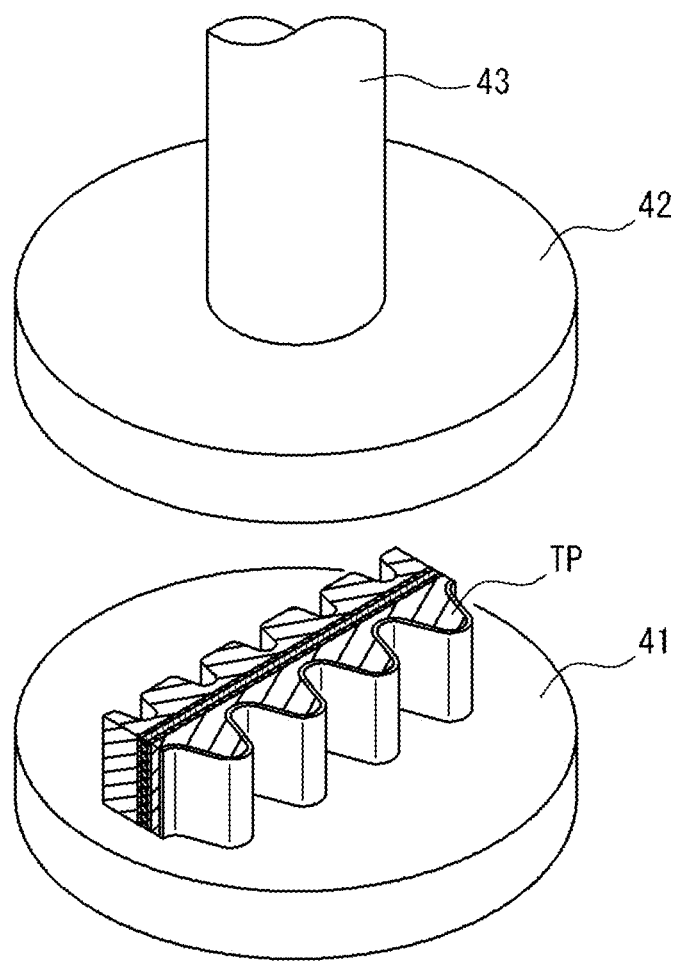
FIG. 4 illustrates a method for measuring a compressive elastic modulus.

FIG. 4 illustrates a method for measuring the compressive elastic modulus.

First, a test piece TP shown in FIG. 4 is cut out from the double-cogged V-belt 10 using a cutter.

As for the dimensions of the test piece TP, the length, the width, and the thickness thereof are a length equivalent to four lower cogs, the maximum belt thickness, and 40% of the belt minimum width, respectively.

Here, the length of the test piece TP is the dimension in the belt length direction of the double-cogged V-belt 10. The width of the test piece TP is the dimension in the belt thickness direction of the double-cogged V-belt 10. The thickness of the test piece TP is the dimension in the belt width direction of the double-cogged V-belt 10.

For the test piece TP, the side surfaces on both sides of the double-cogged V-belt 10 are cut off such that the test piece TP has a constant thickness dimension as a whole. Two side surfaces 31 of the test piece TP are parallel.

The compressive elastic modulus is measured using a fatigue/durability tester. A servopulser manufactured by SHIMADZU CORPORATION can be used as the fatigue/durability tester.

The above fatigue/durability tester includes two flat plates for holding the test piece TP therebetween. As shown in FIG. 4, the two flat plates are composed of a lower plate 41 on which the test piece TP is placed, and an upper plate 42 which is fixed to a shaft 43 and is movable up and down. Surfaces of the lower plate 41 and the upper plate 42 that are brought into contact with the test piece TP are each sized to allow the lower plate 41 or the upper plate 42 to come into contact with the entire lower or upper surface of the test piece TP. The above compressive elastic modulus is measured by sandwiching the test piece TP between the two flat plates 41 and 42 and moving the upper plate 42 up and down to apply a load to the entire upper surface of the test piece TP.

The test conditions are the following conditions.

Load range: −1000±500 N

Frequency: 20 Hz

Temperature: 120° C.

Number of cycles: 3000 cycles

For the compressive elastic modulus, a value in the 100th cycle is obtained, values are further obtained every 100 cycles until the 3000th cycle, the average value of the 30 values obtained is calculated, and the obtained average value is used as a measured value of the compressive elastic modulus.

The above 90° coefficient of friction is measured by the following method.

Figure 5:
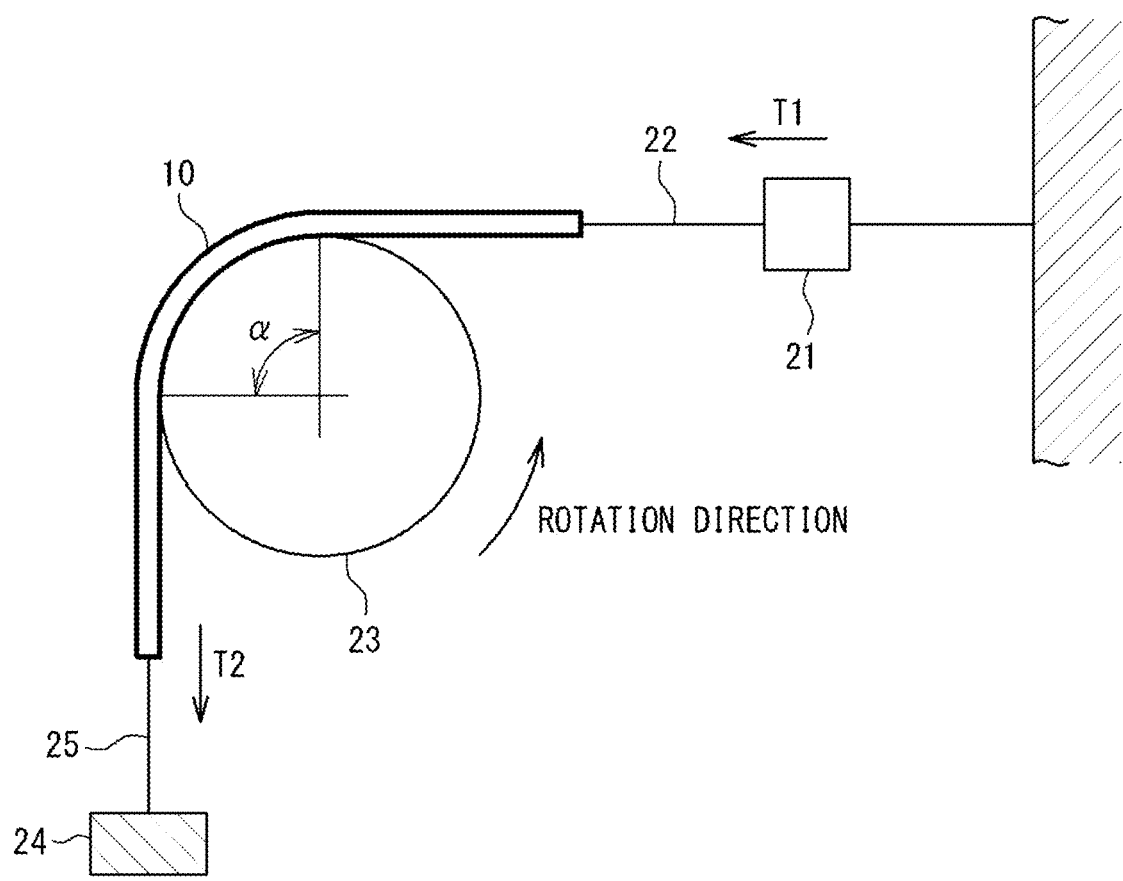
FIG. 5 illustrates a method for measuring a coefficient of friction.

FIG. 5 illustrates a method for measuring the coefficient of friction of the double-cogged V-belt 10.

First, the double-cogged V-belt 10 is cut open by cutting one portion thereof along the belt width direction. Next, one end of the double-cogged V-belt 10 is connected to a load detector 21 such as a load cell via a wire 22. Then, the double-cogged V-belt 10 is wound around a pulley 23 having a groove shaped to correspond to the double-cogged V-belt 10, and a weight 24 is suspended from the other end of the double-cogged V-belt 10 via a wire 25 to apply a downward load to the double-cogged V-belt 10. Then, the pulley 23 is rotated counterclockwise at a predetermined speed, and a 90° coefficient of friction of the belt side surface of the double-cogged V-belt 10 is measured using the following calculation formula.

$$\mu = (1/\alpha) \times \ln(T1/T2)$$

In the formula, T1 is measured tension (N) by the load detector 21, T2 is tension (N) by the weight 24 attached to the other end of the double-cogged V-belt 10, and $\alpha$ is a contact angle (rad) between the double-cogged V-belt 10 and the pulley 23.

In the measurement of the 90° coefficient of friction, a pulley made of stainless steel (S45C) and having a pulley diameter of 96 mm is used as the pulley 23.

A surface roughness Ra of the surface of the pulley 23 that is in contact with the double-cogged V-belt 10 is set to be not less than 0.2 m and not greater than 0.6 m. The surface roughness Ra is the arithmetic mean roughness specified in JIS B0601 (2013).

The tension by the weight 24 is set to 39.2 N.

The rotation speed of the pulley 23 is set to 41 rpm.

The measurement time for the 90° coefficient of friction is set to 30 seconds, and the highest value recorded from 5 seconds to 30 seconds after the start of rotation of the pulley 23 is used as a measured value of the coefficient of friction.

The ambient temperature at the time of measurement is set to 20 to 25° C.

The above-described specification of the raw edge V-belt by the compressive elastic modulus and the 90° coefficient of friction is more suitable than the specification of the raw edge V-belt by the configuration of the rubber composition and the configuration of the cord, as the specification of a raw edge V-belt that has a reduced change in transmission ratio over time and can maintain a shaft load within an appropriate range. This is because the raw edge V-belt is specified on the basis of the configuration of a finished product.

The above double-cogged V-belt 10 can have a reduced change in transmission ratio over time and can maintain a shaft load within an appropriate range.

In addition, the double-cogged V-belt 10 also has sufficient transmission efficiency, so that the belt temperature is also less likely to rise during running.

Therefore, the double-cogged V-belt 10 is a belt having a very good performance balance.

The double-cogged V-belt 10 can be produced by a known method.

The double-cogged V-belt 10 is configured such that only the inner circumferential surface of the compression rubber layer 112 is covered with the reinforcement fabric 13, but the double-cogged V-belt according to the embodiment of the present invention is not limited thereto.

The double-cogged V-belt according to the embodiment of the present invention may be configured such that only the outer circumferential surface of the stretch rubber layer 113 is covered with a reinforcement fabric. Alternatively, the double-cogged V-belt may be configured such that each of the inner circumferential surface of the compression rubber layer 112 and the outer circumferential surface of the stretch rubber layer 113 is covered with a reinforcement fabric. Still alternatively, the double-cogged V-belt may be configured such that each of the inner circumferential surface of the compression rubber layer 112 and the outer circumferential surface of the stretch rubber layer 113 is not covered with a reinforcement fabric.

Although the double-cogged V-belt has been described so far as a raw edge V-belt according to an embodiment of the present invention, the raw edge V-belt according to the embodiment of the present invention is not limited thereto. The raw edge V-belt according to the embodiment of the present invention may be a single-cogged V-belt, or may be a raw edge V-belt having no cog.

EXAMPLES

Hereinafter, the embodiment of the present invention will be more specifically described by means of examples, but the embodiment of the present invention is not limited to the examples below.

(Double-Cogged V-Belts)

Double-cogged V-belts of Examples 1 to 5 and Comparative Examples 1 to 5 below were produced.

Examples 1 to 5

Double-cogged V-belts having the same configuration as the double-cogged V-belt 10 described above were produced.

The same rubber composition was used as rubber compositions forming the adhesive rubber layer, the compression rubber layer, and the stretch rubber layer.

The configurations of the rubber compositions used in Examples 1 to 5 are shown in Table 1.

The cord was composed of a twisted yarn of para-aramid fibers subjected to an RFL treatment and a rubber glue treatment.

The reinforcement fabric was composed of a woven fabric of aramid fibers subjected to an RFL treatment and a rubber glue treatment.

The double-cogged V-belts of Examples 1 to 5 had a belt length of 1100 mm, a maximum belt width of 32 mm, a maximum belt thickness of 16.5 mm, and an angle of 28° between the inclined surfaces forming the pulley contact surfaces on both sides.

The adhesive rubber layer, the compression rubber layer, and the stretch rubber layer were each formed from a rubber composition containing chloroprene rubber (CR) or ethylene-propylene-diene terpolymer (EPDM) as a rubber component. The rubber compositions forming the compression rubber layer and the stretch rubber layer contained aramid staple fibers such that the fibers were oriented in the belt width direction.

Each lower cog had a height HL of 7.0 mm, a width WL of 11.0 mm, and an arrangement pitch PL of 11.0 mm. Each upper cog had a height HU of 4.0 mm, a width WU of 9.0 mm, and an arrangement pitch PU of 9.0 mm.

The outer diameter in the belt width direction of the cord was 1.0 mm. The arrangement pitch of the cord was 1.2 mm.

The pulley contact surfaces on both sides of each belt were formed by either buffing or cutting.

TABLE 1

|  | Example 1 | Example 2 | Example 3 | Example 4 | Example 5 |
|---|---|---|---|---|---|
| CR (SKYPREN 505, manufactured by Tosoh Corporation) | 100 | — | 100 | 100 | 100 |
| EPDM (T7241, manufactured by JSR Corporation) | — | 100 | — | — | — |
| Carbon black | 45 | 40 | 45 | 50 | 45 |
| Oil (DOS) | 5 | — | 5 | 5 | 5 |
| Oil (SUNPAR 2280) | — | 10 | — | — | — |
| Stearic acid | 0.5 | 0.5 | 0.5 | 0.5 | 0.5 |
| Zinc oxide | 6 | 6 | 6 | 6 | 6 |
| Zinc powder | 5 | — | 5 | 5 | 5 |
| MgO | 5 | — | 5 | 5 | 5 |

TABLE 1-continued

|  | Example 1 | Example 2 | Example 3 | Example 4 | Example 5 |
|---|---|---|---|---|---|
| Crosslinking agent (PERHEXA 25B-40, manufactured by NOF CORPORATION, purity: 40 mass %) | — | 5 | — | — | — |
| Co-crosslinking agent (VULNOC PM, manufactured by OUCHI SHINKO CHEMICAL INDUSTRIAL CO., LTD.) | 5 | 5 | 5 | 5 | 5 |
| Aramid staple fibers (Technora, manufactured by TEIJIN LIMITED) | — | — | — | 25 | — |
| Aramid staple fibers (Kevlar 119, manufactured by DuPont de Nemours, Inc.) | 20 | 25 | 15 | — | 15 |
| Aramid staple fibers (Conex, manufactured by TEIJIN LIMITED) | — | — | — | — | — |
| Processing method for pulley contact surfaces on both sides of belt | Cutting | Buffing | Buffing | Cutting | Cutting |

Comparative Examples 1 to 5

Double-cogged V-belts were produced in the same manner as in the Examples, except that the rubber compositions for forming the adhesive rubber layer, the compression rubber layer, and the stretch rubber layer were changed.

The configurations of the rubber compositions used in Comparative Examples 1 to 5 are shown in Table 2.

TABLE 2

|  | Comparative Example 1 | Comparative Example 2 | Comparative Example 3 | Comparative Example 4 | Comparative Example 5 |
|---|---|---|---|---|---|
| CR (SKYPREN 505, manufactured by Tosoh Corporation) | 100 | — | — | — | — |
| EPDM (T7241, manufactured by JSR Corporation) | — | 100 | 100 | 100 | 100 |
| Carbon black | 50 | 45 | 45 | 40 | 45 |
| Oil (DOS) | 5 | — | — | — | — |
| Oil (SUNPAR 2280) | — | 10 | 10 | 10 | 10 |
| Stearic acid | 0.5 | 0.5 | 0.5 | 0.5 | 0.5 |
| Zinc oxide | 6 | 6 | 6 | 6 | 6 |
| Zinc powder | 5 | — | — | — | — |
| MgO | 5 | — | — | — | — |
| Crosslinking agent (PERHEXA 25B-40, manufactured by NOF CORPORATION, purity: 40 mass %) | — | 5 | 5 | 5 | 5 |
| Co-crosslinking agent (VULNOC PM, manufactured by OUCHI SHINKO CHEMICAL INDUSTRIAL CO., LTD.) | 5 | — | — | 5 | — |
| Aramid staple fibers (Technora, manufactured by TEIJIN LIMITED) | 25 | — | — | — | — |
| Aramid staple fibers (Kevlar 119, manufactured by DuPont de Nemours, Inc.) | — | 15 | — | 25 | 15 |
| Aramid staple fibers (Conex, manufactured by TEIJIN LIMITED) | — | — | 20 | — | — |
| Processing method for pulley contact surfaces on both sides of belt | Buffing | Cutting | Cutting | Cutting | Buffing |

(Evaluation of Physical Properties)

For the double-cogged V-belts produced in the Examples and the Comparative Examples, the compressive elastic modulus in the belt width direction at 120° C. and the 90° coefficient of friction on the belt side surface were measured by the above-described methods. The results are shown in Table 3.

In the measurement of the compressive elastic modulus, the dimensions of the test piece TP were set to a length of 45 mm, a thickness of 10 mm, and a width of 16.5 mm (see FIG. 3).

The surface roughness Ra of the surface of the pulley 23 that is in contact with the double-cogged V-belt 10 was set to 0.2 m.

The following evaluations (1) to (4) were made. In a belt running test below, a running test with a drive shaft torque set to 80 N·m was a running test during high-load transmission.

(Performance Evaluation)

(1) Ratio Change Rate

Each of the double-cogged V-belts of Examples 1 to 5 and Comparative Examples 1 to 5 was wound around a drive pulley and a driven pulley each having a variable winding diameter. The drive pulley was rotated at 2500 rpm to run the belt, and an input rotation speed ($N_1$) and an output rotation speed ($N_2$) immediately after the start of belt running and an input rotation speed ($N_1'$) and an output rotation speed ($N_2'$) when the drive shaft torque was set to 80 N·m were measured. The rate of change in transmission ratio (ratio change rate) was calculated on the basis of the following calculation formula. The results are shown in Table 3.

$$\text{Ratio change rate} = \left(\frac{N_1'}{N_2'} - \frac{N_1}{N_2}\right) \div \frac{N_1}{N_2} \times 100$$

(2) Shaft Load (N)

The shaft load during belt running was detected using a load cell.

Here, the belt was run under the same conditions as in the evaluation of (1) ratio change rate, the drive shaft torque was set to 80N·m, the shaft load was detected for 30 seconds after 10 seconds, and the average value was used as a result value. Data sampling was performed at 200 millisecond intervals.

(3) Belt Temperature (° C.)

In the evaluation of (1) ratio change rate, the belt temperature during belt running was measured using a non-contact thermometer. The average value of the belt temperature when a drive shaft torque of 80N·m was maintained for 30 seconds was used as a result value. The results are shown in Table 3.

(4) Transmission Efficiency (%)

Each of the double-cogged V-belts of Examples 1 to 5 and Comparative Examples 1 to 5 was wound around a drive pulley and a driven pulley each having a variable winding diameter. The drive pulley was rotated at 2500 rpm with a drive shaft torque set to 80 N·m to run the belt. An input rotation speed ($N_1$), an input torque ($Tr_1$), an output rotation speed ($N_2$), and an output torque ($Tr_2$) were measured when the winding diameters of the drive pulley and the driven pulley were the same. Transmission efficiency was calculated on the basis of the following calculation formula. The results are shown in Table 3.

$$\text{Overall score} = \text{score of (1) ratio change rate} \times 2 + \text{score of (2) shaft load} \times 2 + \text{score of (3) belt temperature} + \text{score of (4) transmission efficiency}$$

An object of the present invention is to provide a raw edge V-belt that can have a reduced change in transmission ratio over time and can maintain a shaft load within an appropriate range. From this viewpoint, the ratio change rate and the shaft load were weighted more heavily than the belt temperature and the transmission efficiency in the calculation of the overall score.

TABLE 3

|  | Comp. Ex. 1 | Ex. 1 | Comp. Ex. 2 | Comp. Ex. 3 | Comp. Ex. 4 | Comp. Ex. 5 | Ex. 2 | Ex. 3 | Ex. 4 | Ex. 5 |
| --- | --- | --- | --- | --- | --- | --- | --- | --- | --- | --- |
| 90° coefficient of friction | 1.17 | 1.59 | 1.89 | 1.60 | 2.10 | 1.26 | 1.47 | 1.45 | 1.75 | 1.75 |
| Compressive elastic modulus at 120° C. (MPa) | 235 | 200 | 125 | 87 | 240 | 133 | 235 | 165 | 235 | 165 |
| (1) Ratio change rate | 6.5 | 5.8 | 6.4 | 10.5 | 5.3 | 6.7 | 5.6 | 6.4 | 5.5 | 6.4 |
| (Score) | 2 | 3 | 2 | 1 | 3 | 2 | 3 | 2 | 3 | 2 |
| (2) Shaft load (N) | 2,433 | 3,282 | 3,133 | 2,922 | 3,601 | 2,275 | 3,302 | 3,219 | 3,433 | 3,289 |
| (Score) | 1 | 3 | 3 | 2 | 2 | 1 | 3 | 3 | 3 | 3 |
| (3) Belt temperature (° C.) | 51.7 | 52.1 | 63.2 | 54.7 | 61.3 | 51.6 | 52.2 | 53.9 | 56.1 | 53.0 |
| (Score) | 3 | 3 | 1 | 2 | 1 | 3 | 3 | 2 | 2 | 2 |
| (4) Transmission efficiency (%) | 92.2 | 91.3 | 90.3 | 88.1 | 90.9 | 92.3 | 92.3 | 91.2 | 91.6 | 91.0 |
| (Score) | 3 | 2 | 2 | 1 | 2 | 3 | 3 | 2 | 2 | 2 |
| Overall score (1) × 2 + (2) × 2 + (3) + (4) | 12 | 17 | 13 | 9 | 13 | 12 | 18 | 14 | 16 | 14 |

$$\text{Transmission efficiency} = \frac{N_2 \times Tr_2}{N_1 \times Tr_1} \times 100$$

(Performance Evaluation Results)

The results of the evaluations (1) to (4) below were scored according to the following criteria. The results are shown in Table 3. As for the scoring, the higher the score is, the higher the performance is.

(1) Ratio Change Rate
 1 point: 8 or more
 2 points: 6 or more but less than 8
 3 points: less than 6

(2) Shaft Load
 1 point: less than 2500 N or 4000 N or more
 2 points: 2500 N or more but less than 3000 N, or 3500 N or more but less than 4000 N
 3 points: 3000 N or more but less than 3500 N (3) Belt Temperature
 1 point: 60° C. or higher
 2 points: 53° C. or higher but lower than 60° C.
 3 points: lower than 53° C.

A belt temperature of 60° C. or higher is considered to have a great impact on a decrease in transmission efficiency and durability.

(4) Transmission Efficiency
 1 point: less than 90%
 2 points: 90% or more but less than 92%
 3 points: 92% or more Then, an overall score was calculated using the following calculation formula on the basis of the score of each evaluation item. The results are shown in Table 3.

As is obvious from the results shown in Table 3, the double-cogged V-belts of Examples 1 to 5 had the highest score of 3 points for one or both of (1) ratio change rate and (2) shaft load, with an overall score of 14 points or higher.

On the other hand, the double-cogged V-belts of Comparative Examples 1 to 5 had an overall score of 13 points or less.

From these results, it is clear that the raw edge V-belt according to the embodiment of the present invention is an excellent raw edge V-belt that can have a reduced change in transmission ratio over time even during high-load transmission, can maintain a shaft load within an appropriate range, and further has a good performance balance in that a rise in belt temperature can be suppressed and sufficient transmission efficiency can be ensured.

REFERENCE SIGNS LIST

10 double-cogged V-belt
11 belt body
111 adhesive rubber layer
112 compression rubber layer
112a lower cog forming portion
113 stretch rubber layer
12 cord
13 reinforcement fabric
14 lower cog
15 upper cog
21 load detector
22, 25 wire
23 pulley 24 weight
41 lower plate
42 upper plate
TP test piece

The invention claimed is:

1. A raw edge V-belt comprising:
a belt body made of rubber and having pulley contact surfaces formed on both sides thereof in a belt width direction; and
a cord embedded in the belt body, wherein
a compressive elastic modulus of the raw edge V-belt in the belt width direction measured at 120° C. is not less than 150 MPa and not greater than 250 MPa, and
a 90° coefficient of friction on a belt side surface of the raw edge V-belt is not less than 1.4 and not greater than 1.8.

2. The raw edge V-belt according to claim 1, being a double-cogged V-belt having a plurality of cogs on each of a belt inner circumference side and a belt outer circumference side thereof.

* * * * *